(12) United States Patent
Wischinski

(10) Patent No.: US 6,801,920 B1
(45) Date of Patent: Oct. 5, 2004

(54) SYSTEM FOR REMOTE MANAGEMENT OF APPLICATIONS OF AN INDUSTRIAL CONTROL SYSTEM

(75) Inventor: Rainer H. Wischinski, Sandown, NH (US)

(73) Assignee: Schneider Automation Inc., North Andover, MA (US)

( * ) Notice: Subject to any disclaimer, the term of this patent is extended or adjusted under 35 U.S.C. 154(b) by 385 days.

(21) Appl. No.: 09/609,355

(22) Filed: Jul. 5, 2000

(51) Int. Cl.[7] .............................................. G06F 17/30
(52) U.S. Cl. ....................... 707/203; 707/7; 707/104.1; 709/201
(58) Field of Search ........................ 717/1, 11; 455/428; 703/21; 709/201; 710/7, 302, 104, 8; 707/202, 203, 204, 7, 104.1, 8

(56) References Cited

U.S. PATENT DOCUMENTS

| | | | | |
|---|---|---|---|---|
| 4,763,317 A | * | 8/1988 | Lehman et al. | 370/358 |
| 5,499,357 A | * | 3/1996 | Sonty et al. | 395/500 |
| 5,619,716 A | * | 4/1997 | Nonaka et al. | 395/800 |
| 6,112,085 A | * | 8/2000 | Garner et al. | 455/428 |
| 6,185,466 B1 | * | 2/2001 | Nicewonger | 700/19 |
| 6,208,955 B1 | * | 3/2001 | Provan et al. | 703/20 |
| 6,256,773 B1 | * | 7/2001 | Bowman-Amuah | 707/203 |
| 6,272,678 B1 | * | 8/2001 | Imachi et al. | 717/11 |
| 6,289,331 B1 | * | 9/2001 | Pedersen et al. | 706/60 |
| 6,347,398 B1 | * | 2/2002 | Parthasarathy et al. | 707/203 |
| 6,366,217 B1 | * | 4/2002 | Cunningham et al. | 340/870.31 |
| 6,381,742 B2 | * | 4/2002 | Forbes et al. | 707/203 |
| 6,424,872 B1 | * | 7/2002 | Glanzer et al. | 700/18 |
| 6,442,551 B1 | * | 8/2002 | Ofek | 707/10 |

\* cited by examiner

*Primary Examiner*—Charles Rones
*Assistant Examiner*—Hassan Mahmoudi
(74) *Attorney, Agent, or Firm*—David R. Stacey

(57) ABSTRACT

A system for providing remote configuration management for an industrial control system (ICS) over a wide area network (such as the Internet), including keeping track of each application used by each device of the ICS, the system including: a configuration database, for keeping track of past and present configurations (which devices are or were in use by the ICS in each configuration); a remote sensing module, for determining information about the ICS devices and about applications used by the ICS devices; a configuration manager, for providing over the wide area network a restored copy of an application used by an ICS device; and utilities for enabling communication over a wide area network. The system optionally includes a billing manager that receives from the configuration manager information about each service performed by the configuration manager.

6 Claims, 2 Drawing Sheets

SYSTEM FOR REMOTE MANAGEMENT OF APPLICATIONS OF AN INDUSTRIAL CONTROL SYSTEM

BACKGROUND OF THE INVENTION

1. Technical Field

The present invention pertains to the field of industrial control automation. More particularly, the present invention pertains to managing the custom applications for an industrial control system over a wide area network such as the Internet, the managing including for example keeping track of the latest version of each application, and configuration management generally, and backing up and restoring the applications.

2. Description of Related Art

The operator of an industrial control system (ICS) often employs an outside automation specialist to develop what are called the applications for the intelligent devices of the ICS; the ICS operator often knows what the ICS must do, but does not know how to program the intelligent devices, i.e. to develop the applications for the intelligent devices, to do what must be done.

Since the applications that automate an ICS evolve from earlier versions to later versions, and on occasion it is necessary to refer back to an earlier version, there is a need to keep copies of each version of each application, noting the changes from version to version, and to be able to reconfigure an intelligent device so as to use an earlier version. Such configuration management also allows restoring an application in case of equipment malfunction causing the loss of an application. But the operator of an ICS is often only slightly better equipped to handle configuration management of the ICS than to develop applications for the ICS.

Thus, there is often a need for outside automation specialists to provide configuration management for an ICS. But providing configuration management service on site is significantly more expensive than providing such a service remotely, over a wide area network such as the Internet.

Accordingly, what is needed is a system for providing over a wide area network, such as the Internet, configuration management of the applications of an ICS, including restoring a configuration when needed, such as in case of equipment malfunction.

SUMMARY OF THE INVENTION

Accordingly, the present invention provides a system for providing remote configuration management for an industrial control system (ICS) over a wide area network, such as the Internet, the configuration management including keeping track of each application used by each device of the ICS. The system includes: a) a configuration database, responsive to updates on which devices are in use by the ICS and to which versions of which applications are used by each device, and further responsive to which applications on which devices constitute each past configuration about which update information has been made and also to the present configuration of the ICS, for providing copies of each version of each application for which an update has been made; a remote sensing module, responsive to information stored in the configuration database, for providing over the wide area network to the ICS devices queries as to the identity of the ICS devices and as to the application identifier and version number of at least some applications used by at least some of the devices, and responsive to corresponding application information provided over the wide area network by the at least some devices and for storing the corresponding application information in the configuration database; a configuration manager, responsive to the corresponding application information in the configuration database, for obtaining over the wide area network backup copies of the current version of at least some of the applications on at least some of the devices, and responsive to restore commands, for providing over the wide area network a restored copy of an application based on either an application identifier and version number or based on a configuration identifier; and utilities for enabling communication over a wide area network.

In a further aspect of the invention, the restore commands issued to the configuration manager are provided over the wide area network directly from an ICS operator at the ICS.

In another, further aspect of the invention, the wide area network is the Internet, and the system also includes a browser for providing communication over the Internet.

In yet another, further aspect of the invention, the configuration manager also provides information about a service it performs, and the system also includes a billing manager, responsive to the information about the service performed by the configuration manager, for making a record of the service performed by the configuration manager; and in a further aspect of the invention, the information about the service performed by the configuration manager includes the type of service and the total size (in e.g. kbytes) of all of the applications to which the service is directed.

BRIEF DESCRIPTION OF THE DRAWINGS

The above and other objects, features and advantages of the invention will become apparent from a consideration of the subsequent detailed description presented in connection with accompanying drawings, in which.

BEST MODE FOR CARRYING OUT THE INVENTION

The present invention will now be described in the case of providing remote configuration management services over the Internet, although the invention should be understood to encompass providing such services via other wide area networks.

Figure 1:
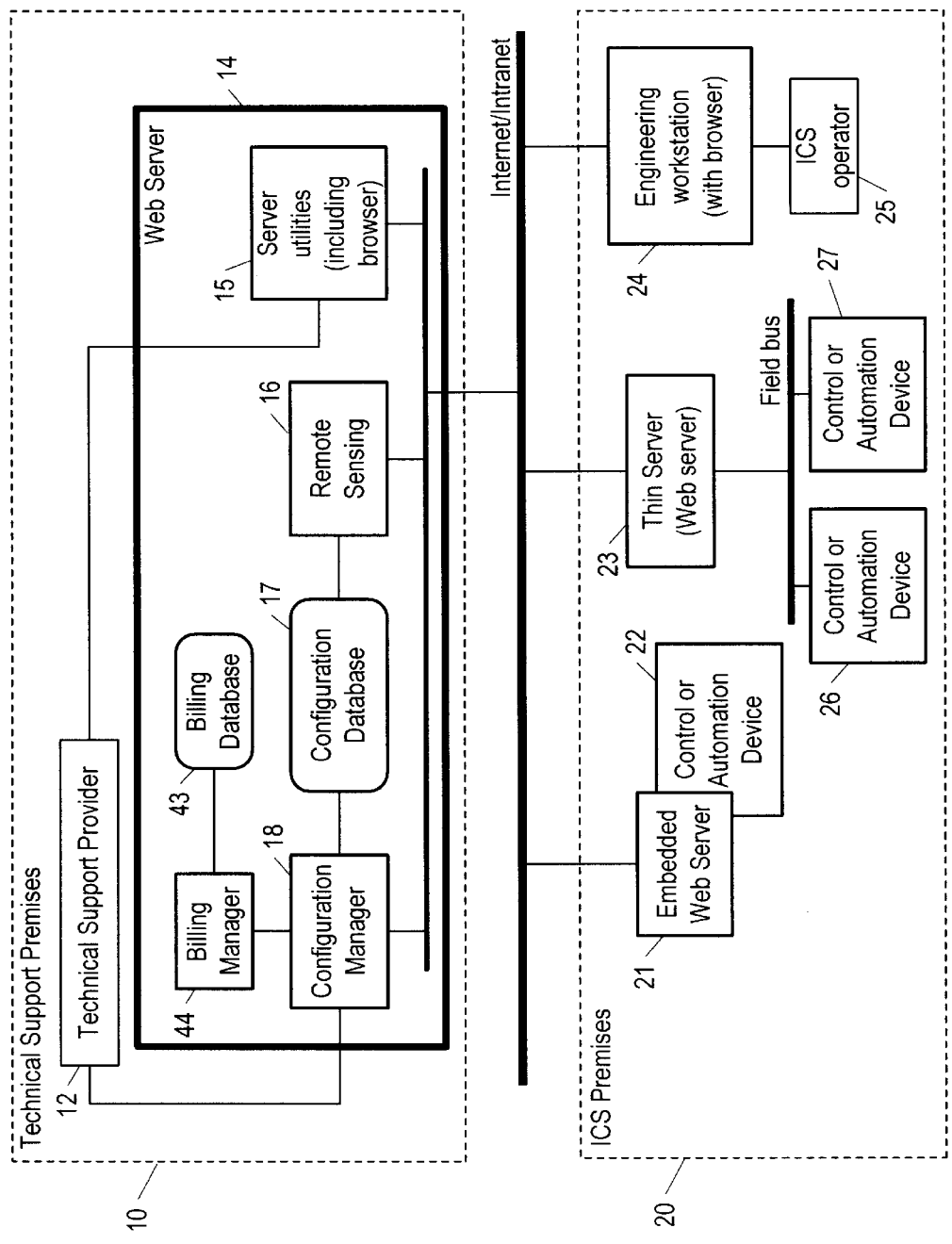
FIG. 1 is a context block diagram showing a system for remotely providing configuration management services for an industrial control system (ICS)

Referring now to FIG. 1, in the preferred embodiment, to provide via the Internet configuration management services for custom applications of an industrial control system (ICS) at ICS premises 20 from technical support premises 10, the present invention includes a configuration database 17 hosted by a web server 14 that uses server utilities 15 to provide access to the Internet. In addition, the web server hosts a configuration manager module 18, and a remote sensing module 16, both of which refer to and update the configuration database 17 in the course of providing configuration management services. The web server 14 can be either connected directly to the Internet as in the preferred embodiment, or can be connected to the Internet via an Internet Service Provider (ISP), not shown.

Also shown in FIG. 1 are components of an ICS at the ICS premises 20, including an engineering workstation 24 with a browser 42 (see FIG. 2) and various control or automation devices 22, 26 connected to the Internet via either an embedded web server 21 or a so-called thin server (a web server) 23. In case of a control or automation device 26 attached to the Internet via a thin server 23, the device 26 is typically also connected to other devices 27 via a field bus, as shown in FIG. 1. The engineering workstation 24 enables an ICS operator 25 to communicate with a technical support provider (a person) 12 via the web server 14 with a browser 41 (see FIG. 2) provided as part of the server utilities 15, or to request a service from the configuration manager module 18.

The control or automation devices 21, 26, 27 are so-called intelligent devices, able to respond to queries as to their current state, the applications that are executing, and the version of each application. In addition, they can be made to provide over the Internet to a remote requester a copy of an application via their web servers 21, 23. Finally, they can be made to accept a copy of an application provided over the Internet via their web servers.

Still referring to FIG. 1, the web server 14 is shown as also including a billing manager 44 that tracks all services provided by the configuration manager. The billing manager 44 saves the information needed to determine a charge to the ICS operator for application management services.

Figure 2:
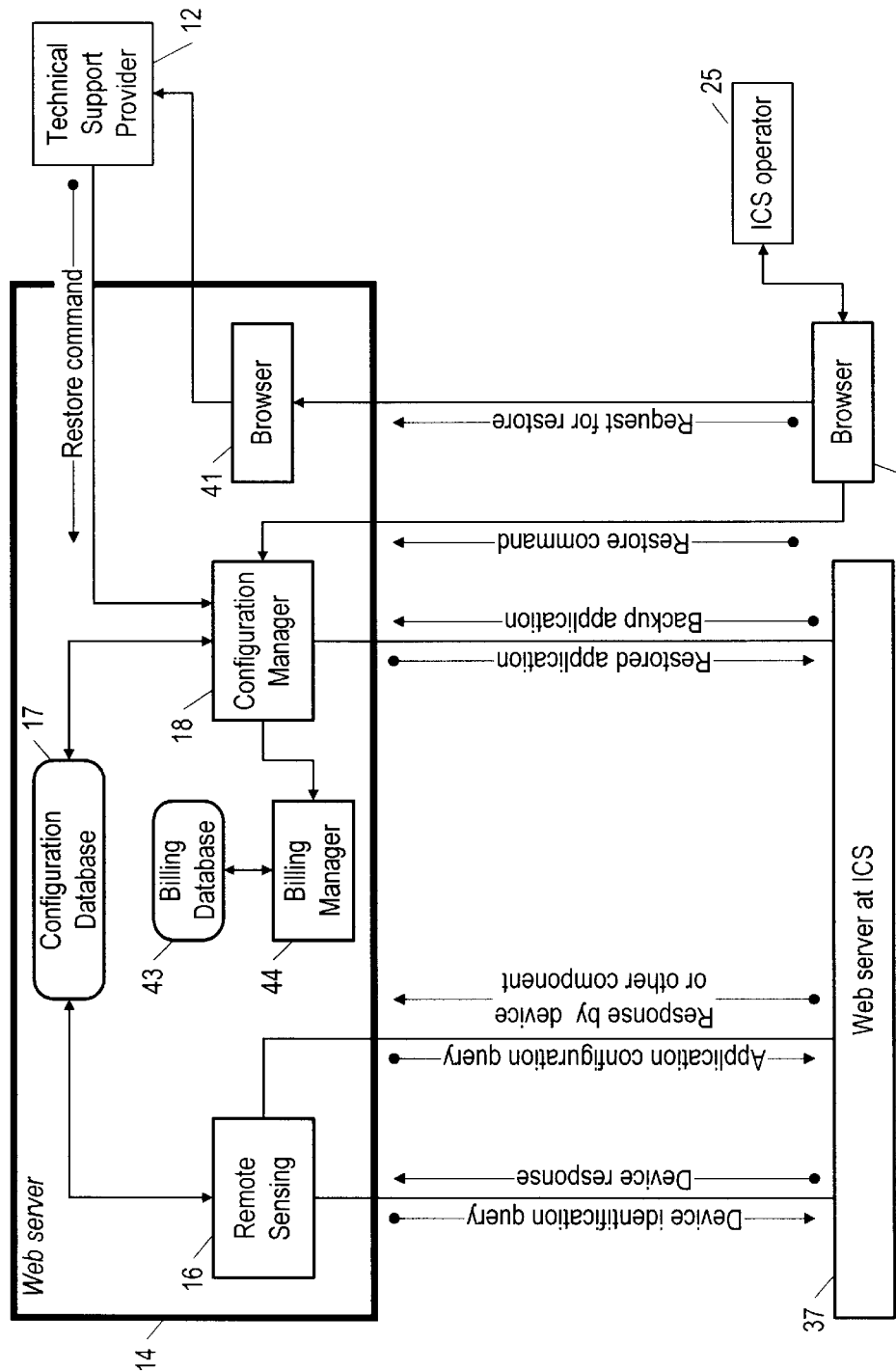
FIG. 2 is a more detailed block diagram of the system showing how the system modules interact with equipment of the ICS, but for clarity not showing the wide area network over which the configuration management services are provided.

Referring now to FIG. 2, the remote sensing module 16 is shown as first querying the devices of the ICS, such as device A, and updating the configuration database 17 on the basis of the device responses. Such device identification is used to create records in a table of the configuration database 17 indicating what devices (hardware) are included in the ICS, devices that each host one or more applications.

Following the device identification, the remote sensing module 16 queries each device so identified to determine what applications are used by the device. The remote sensing module then creates and updates a second table in the configuration database 17, a table of applications, with each application related to a particular device.

It is important to understand that the devices that are identified are not necessarily control or automation devices, but can be any ICS hardware that executes one or more applications. Thus, for example, the remote sensing module 16 will attempt to identify not only control or automation devices but also for example a host controller, such as a programmable logic controller.

Once a device is identified along with its applications, the configuration manager 18 obtains copies of the resident version of each application on each device to be used as backup copies. The configuration manager obtains the copies of the applications via the web servers associated with each device 21, 26, i.e. either the embedded web servers 21 or the thin servers 23. The configuration manager 18 saves a copy of each application in the table of applications, using a version number to identify the version of each application. Subsequent versions can be added to the same table, using the version number as a key to the table, thus enabling the table to be used to store many versions of each application for each device.

To provide overall configuration management, in addition to a version number for each application, a separate table of configurations is maintained. The table includes records that use a configuration identifier as a non-unique key and identify each application by version number of each device for each configuration. Thus, for example, if a single application changes to a new version, records are added to the table of configurations indicating that all of the unchanged versions of applications are part of the new configuration and also that the single, changed application is part of the new configuration. With this approach, the same version of an application used by a device can be indicated as belonging to many different configurations. Other approaches are also possible, including for example providing a separate table for each application, using the application identifier and version number as keys, and providing a record indicating the configuration for each configuration to which the application belongs.

Thus, in case of an ICS operator 25 requesting that the technical support provider 12 either restore a particular application or restore an entire configuration, the technical support provider will indicate a corresponding restore command to the configuration manager 18, which can then refer to the configuration database 17 to provide appropriate application versions to each device 38.

As explained above, the ICS operator 25 can also request a configuration service, such as restoring a previous configuration, directly from the configuration manager 18.

The billing manager 44 records all services provided by the configuration manager 18, either because of a service having been provided automatically by the configuration manager (such as a scheduled backup), a service requested of the configuration manager directly by the ICS operator 25, or a service commanded by the technical support provider 12. The information recorded includes the type of service and the cumulative size of the applications involved in the service. For example, a service of restoring an earlier configuration of a certain size might be provided on a certain date. Then the billing manager would store in the billing database 43 that on the given date, a configuration was restored, and would also store the size of the earlier configuration. A charge to the ICS operator could then be made based on the type of service (in this case a restore configuration service) and the total of the sizes of the applications restored by the service.

It is to be understood that the above-described arrangements are only illustrative of the application of the principles of the present invention. Numerous modifications and alternative arrangements may be devised by those skilled in the art without departing from the spirit and scope of the present invention, and the appended claims are intended to cover such modifications and arrangements.

What is claimed is:

1. A system for providing remote configuration management over a wide area network for an industrial control system (ICS), the configuration management including keeping track of each application used by each device of the ICS, the system comprising:

a) a configuration database, responsive to updates on which devices are in use by the ICS and to which versions of which applications are used by each device, and further responsive to which applications on which devices constitute each past configuration about which update information has been made and also to the present configuration of the ICS, for providing copies of each version of each application for which an update has been made;

b) a remote sensing module, responsive to information stored in the configuration database, for providing over the wide area network to the ICS devices queries as to the identity of the ICS devices and as to the application identifier and version number of at least some applications used by at least some of the devices, and responsive to corresponding application information provided over the wide area network by the at least some devices and for storing the corresponding application information in the configuration database;

c) a configuration manager, responsive to the corresponding application information in the configuration database, for obtaining over the wide area network backup copies of the current version of at least some of the applications on at least some of the devices, and responsive to restore commands, for providing over the wide area network a restored copy of an application based on either an application identifier and version number or based on a configuration identifier; and d) utilities for enabling communication over a wide area network.

2. The system of claim 1, wherein the restore commands issued to the configuration manager are provided over the wide area network directly from an ICS operator at the ICS.

3. The system of claim 1, wherein the wide area network is the Internet, and further comprising a browser, for providing communication over the Internet.

4. The system of claim 1, wherein the configuration manager also provides information about a service it performs, and also wherein the system further comprises a billing manager, responsive to the information about the service performed by the configuration manager, for making a record of the service performed by the configuration manager.

5. The system of claim 4, wherein the information about the service performed by the configuration manager includes the type of service and the total size of all of the applications to which the service is directed.

6. The system of claim 5, wherein the wide area network is the Internet, and further comprising a browser, responsive to and for providing communication over the Internet.

* * * * *